US011405356B2

(12) United States Patent
Zutshi et al.

(10) Patent No.: US 11,405,356 B2
(45) Date of Patent: Aug. 2, 2022

(54) RESOLVING MEDIA DEADLOCKS USING STUN

(71) Applicant: Cisco Technology, Inc., San Jose, CA (US)

(72) Inventors: Ishan Zutshi, Bangalore (IN); Kaustubh Inamdar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/000,794

(22) Filed: Aug. 24, 2020

(65) Prior Publication Data
US 2022/0060442 A1 Feb. 24, 2022

(51) Int. Cl.
| | | |
|---|---|---|
| *H04L 61/2575* | (2022.01) | |
| *H04L 65/1069* | (2022.01) | |
| *H04L 65/1053* | (2022.01) | |
| *H04L 65/10* | (2022.01) | |
| *H04L 65/65* | (2022.01) | |

(52) U.S. Cl.
CPC ...... *H04L 61/2575* (2013.01); *H04L 65/1006* (2013.01); *H04L 65/1053* (2013.01); *H04L 65/1069* (2013.01); *H04L 65/608* (2013.01)

(58) Field of Classification Search
CPC ............. H04L 61/2575; H04L 65/1006; H04L 65/1053; H04L 65/1069; H04L 65/608
See application file for complete search history.

(56) References Cited

U.S. PATENT DOCUMENTS

| | | | |
|---|---|---|---|
| 7,760,744 B1 * | 7/2010 | Mohaban | H04L 63/029 370/401 |
| 2004/0032862 A1 * | 2/2004 | Schoeneberger | H04M 3/5233 370/352 |
| 2007/0121602 A1 * | 5/2007 | Sin | H04L 12/6418 370/356 |
| 2007/0165597 A1 | 7/2007 | Chaturvedi et al. | |

(Continued)

FOREIGN PATENT DOCUMENTS

WO 2007125530 11/2007

OTHER PUBLICATIONS

J. Rosenberg et al., "STUN—Simple Traversal of User Datagram Protocol (UDP) Through Network Address Translators," Mar. 2003. (Year: 2003).*

(Continued)

*Primary Examiner* — Andrew C Georgandellis
(74) *Attorney, Agent, or Firm* — Behmke Innovation Group LLC; Kenneth J. Heywood; Jonathon P. Western

(57) ABSTRACT

In one embodiment, a device in communication with a service provider network obtains first information regarding a first call leg of a media session associated with a first endpoint. The device also obtains second information regarding a second call leg of the media session associated with a second endpoint. Both of the first and second endpoints are anchored in the service provider network. The device makes a determination that the media session is being hairpinned, based on the first and second information. The device sends, based on the determination, an indication message using Session Traversal Utilities for Network Address Translators (STUN) along the first call leg that causes the first endpoint to begin sending a flow of media packets.

18 Claims, 6 Drawing Sheets

(56) References Cited

U.S. PATENT DOCUMENTS

| | | | |
|---|---|---|---|
| 2008/0037430 A1* | 2/2008 | Wah | H04M 7/127 |
| | | | 370/241 |
| 2008/0080532 A1 | 4/2008 | O'Sullivan et al. | |
| 2012/0113977 A1 | 5/2012 | Shimoosawa et al. | |
| 2012/0210007 A1* | 8/2012 | Ormazabal | H04L 63/0227 |
| | | | 709/227 |
| 2019/0364115 A1 | 11/2019 | Asveren et al. | |

OTHER PUBLICATIONS

Ivov, et al., "Latching: Hosted NAT Traversal (HNT) for Media in Real-Time Communication", Internet Engineering Task Force, Request for Comments 7362, Sep. 2014, 16 pages, IETF Trust.

Rosenberg, et al., "Session Traversal Utilities for NAT (STUN)", Network Working Group, Request for Comments 5389, Oct. 2008, 51 pages, IETF Trust.

Keranen, et al., "Interactive Connectivity Establishment (ICE): A Protocol for Network Address Translator (NAT) Traversal", Internet Engineering Task Force, Request for Comments 8445, Jul. 2018, 100 pages, IETF Trust.

Perumal, et al., "Session Traversal Utilities for NAT (STUN) Usage for Consent Freshness", Internet Engineering Task Force, Request for Comments 7675, Oct. 2015, 10 pages, IETF Trust.

Constantinescu, et al., Secure and Flexible Method for SBC/Firewall Management, 2009 International Symposium on Signals, Circuits and Systems, Jul. 2009, 4 pages, IEEE.

"Anti-tromboning", online: https://en.wikipedia.org/wiki/Anti-tromboning, Oct. 2019, 1 page, Wikimedia Foundation, Inc.

"Hairpin Calls", online: https://www.ccexpert.us/voice-gateways/hairpin-calls.html, Aug. 2019, 3 pages, Cisco Certified Expert.

Rosenberg, J., "Interactive Connectivity Establishment (ICE): A Protocol for Network Address Translator (NAT) Traversal for Offer/Answer Protocols", Internet Engineering Task Force, Request for Comments 5245, Apr. 2010, 117 pages, IETF Trust.

"ACLI Configuration Guide", online: https://docs.oracle.com/cd/E95619_01/html/esbc_ecz810_configuration/GUID-EF1DC771-C3A9-4BBF-932D-6AB068E6B635.htm#GUID-EF1DC771-C3A9-4BBF-932D-6AB068E6B635, Jan. 2019, 3 pages, Oracle.

"SIP Trunking", online: https://en.wikipedia.org/wiki/SIP_trunking, May 2020, 2 pages, Wikimedia Foundation, Inc.

"What is SIP?", Strategic Call Center Consulting, Jan. 2018, 4 pages, StrategicContact.com.

* cited by examiner

RESOLVING MEDIA DEADLOCKS USING STUN

TECHNICAL FIELD

The present disclosure relates generally to computer networks, and, more particularly, to resolving media deadlocks using Session Traversal Utilities for Network Address Translators (STUN).

BACKGROUND

In recent years, Session Initiation Protocol (SIP) trunking with service providers has seen a significant increase in adoption. Indeed, it is now predicted that traditional methods of interconnecting with service providers using analog lines or Integrated Services Digital Network (ISDN) circuits will eventually end. However, the interconnection between an enterprise network and service provider SIP networks requires administrators to carry out a regimen of testing and troubleshooting before committing configuration to edge devices that directly interact with SIP service providers, such as session border controllers (SBCs.).

There are certain scenarios that cannot be resolved easily via configuration and require over-the-top workarounds that result in glaring performance inefficiencies. One such scenario is that of hair pinned calls between an enterprise network and service provider SIP networks. In this case, calls coming into the enterprise network could be sent back to the service provider network due to call interactions, such as the result of configurations that may result in calls being sent back to an external network or call-forwarding, leading to a situation wherein the calling and called party devices are anchored on the service provider network. In these cases, the enterprise edge element e.g., an SBC, etc.) merely functions as a Real Time Protocol (RTP) switch, such that packets received from one call leg are switched to the other and vice versa. However, many service providers deploy Latching and Hosted NAT traversal solutions in their network that require peer networks to stream the first RTP packet, which can lead to each call leg waiting for the other to trigger latching and the subsequent flow of RTP packets. In addition, the service provider will remain unaware that the two call legs are related to the same media session.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
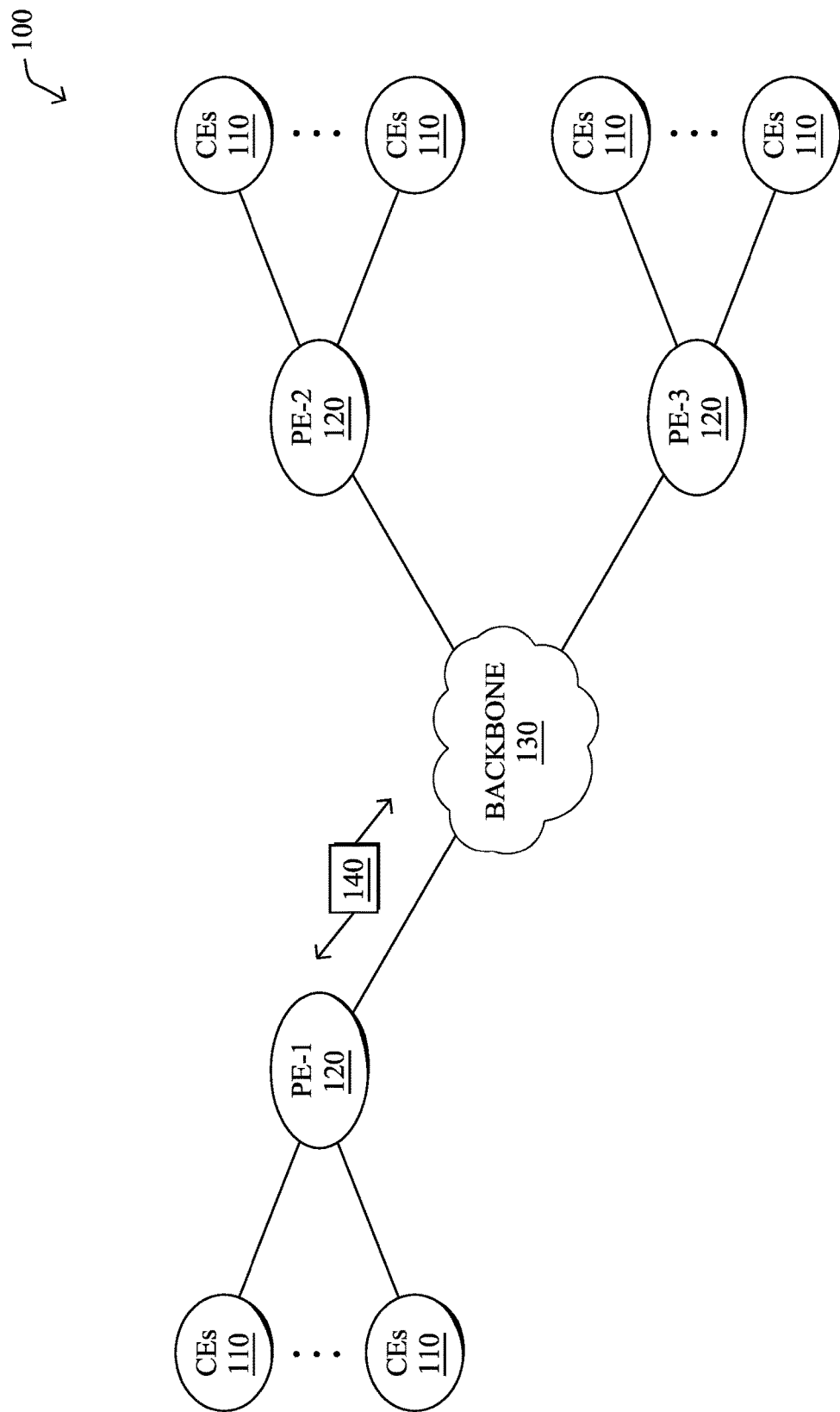
FIGS. 1A-1B illustrate an example communication network.

According to one or more embodiments of the disclosure, a device in communication with a service provider network obtains first information regarding a first call leg of a media session associated with a first endpoint. The device also obtains second information regarding a second call leg of the media session associated with a second endpoint. Both of the first and second endpoints are anchored in the service provider network. The device makes a determination that the media session is being hairpinned, based on the first and second information. The device sends, based on the determination, an indication message using Session Traversal Utilities for Network Address Translators (STUN) along the first call leg that causes the first endpoint to begin sending a flow of media packets.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
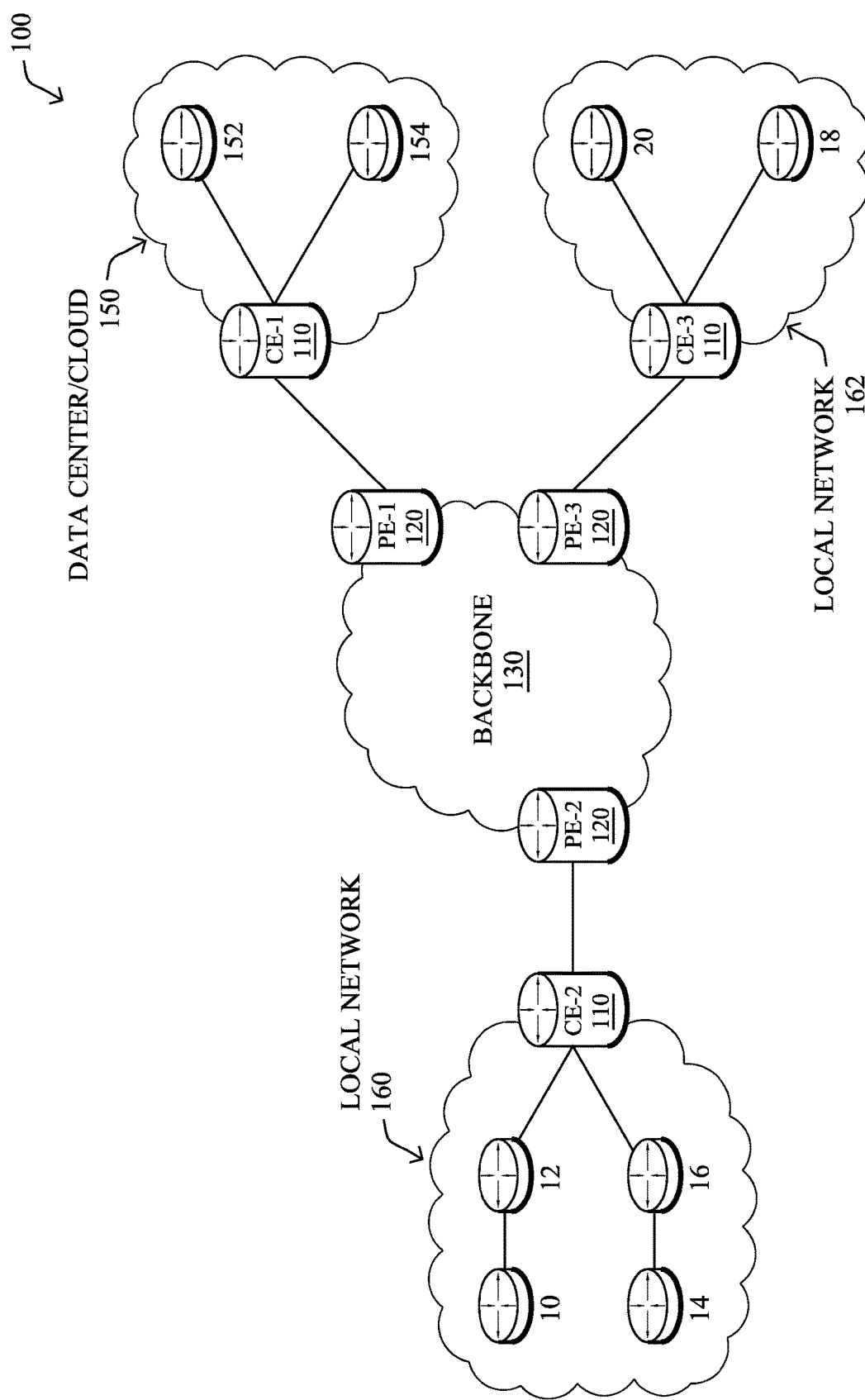

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment).

In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
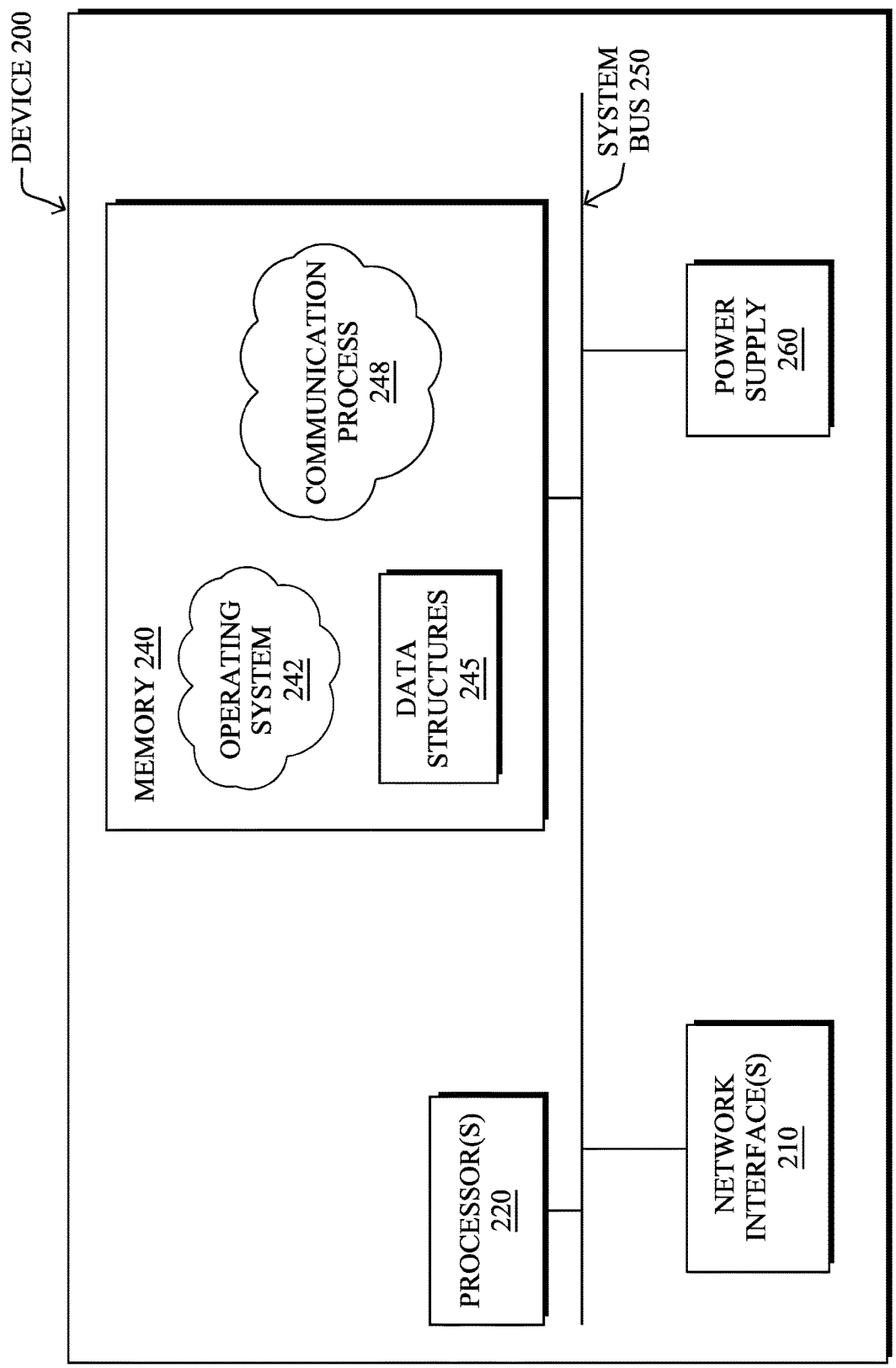
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below (e.g., a client endpoint, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication process 248, as described herein, any of which may alternatively be located within individual network interfaces, the execution of which may cause device 200 to perform any or all of the functions described herein.

In general, communication process 248 may be configured to communicate via a computer network using any number of protocols such as, but not limited to, a link layer protocol (e.g., Ethernet, Frame Relay, etc.), a communication protocol (e.g., IPv4, IPv6, etc.), a transport layer protocol (TCP, UDP, etc.), an application layer protocol such as the Real-time Transport Protocol (RTP), HyperText Transfer Protocol (HTTP), HTTP-secure (HTTPS), Transport Layer Security (TLS) or Secure Socket Layer (SSL) for security, and the like. In various embodiments, communication process 248 may also be configured to establish media calls across various networks. To this end, communication process 248 may leverage a signaling protocol such as the Session Initiation Protocol (SIP), which is typically used to initiate and control real-time sessions used for media, a protocol to handle situations in which firewalls or Network Address Translators (NATs) present challenges, such as Session Traversal Utilities for NATs (STUN), Traversal Using Relays around Network Address Translators (TURN), Interactive Connectivity Establishment (ICE), or the like, in accordance with the teachings herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, service provider SIP trunking has seen a significant increase in adoption, in recent years. In general, SIP trunking is a technique that allows a private branch exchange phone system (PBX) to send and receive calls via an IP network (e.g., the Internet, a private network, etc.). A SIP trunk can be used to convey various forms of media, such as voice, video, and messages. Most often, a SIP trunk is used for purposes of implementing voice over IP (VoIP) by which an Internet telephony service provider (ITSP) can deliver telephony and/or unified communication (UC) services to a network equipped with PBX and/or UC capabilities. For this reason, SIP trunking is on track to eventually replace traditional methods of interconnecting with service providers, such as via analog lines or Integrated Services Digital Network (ISDN) circuits.

Despite the advantages of SIP trunking, the interconnection between an enterprise network and service provider SIP networks often administrators to carry out a regimen of testing and troubleshooting before cornmitting configuration to edge devices that directly interact with SIP service providers, such as session border controllers (SBCs.).

Figure 3:
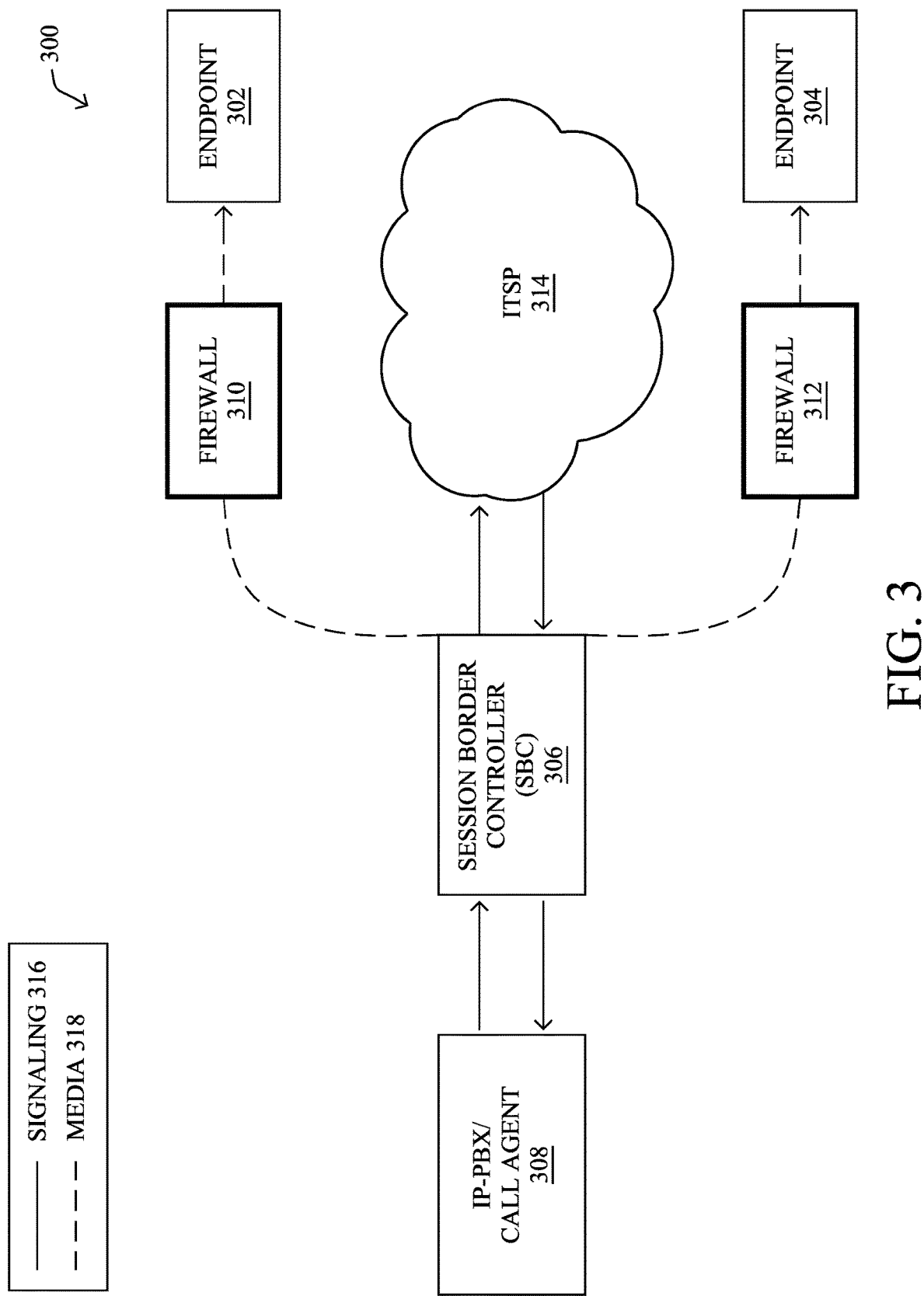
FIG. 3 illustrates an example network architecture in which a media deadlock may occur.

By way of example, FIG. 3 illustrates an example network architecture 300 in which a media deadlock may occur when SIP trunking is used. As shown, assume that there is an IP-PBX/call agent 308 located within an enterprise network. In general, IP-PBX/call agent 308 may operate as a call agent and handle the internal communications of the enterprise network in which it is located, such as connecting telephone extensions to a public switched telephone network (PSTN).

Also shown in network architecture 300 is an Internet telephony service provider (ITSP), ITSP 314, that is to provide VoIP services to the enterprise. To this end, there may be SBC 306 located between IP-PBX/call agent 308 in the enterprise network and ITSP 314. More specifically, SBC 306 may be responsible for enabling signaling 316 between IP-PBX/call agent 308 and ITSP 314, to establish a given call. Typically, signaling 316 may take the form of SIP signaling. As would be appreciated, some SBCs employ a split architecture whereby one appliance is used for signaling and another appliance is used for media, with the two appliances operating in conjunction with one another. In such split cases, the two appliances can be viewed together as a singular SBC device for purposes of the teachings herein.

Assume now that there is an endpoint 302 and another endpoint 304 for which a call is to be established. For instance, endpoints 302-304 may take the form of public switched telephone network (PSTN) phones or other suitable endpoints. In addition, endpoints 302-304 may be behind firewalls 310-312, respectively. In such cases, SBC 306 may cooperate with firewalls 310-312, to allow media 318 to be exchanged between endpoints 302-304 during their call/session, such as via RTP.

Unfortunately, there are certain scenarios that cannot be resolved easily via configuration and require over-the-top workarounds that result in glaring performance inefficiencies. For instance, in the case shown in FIG. 3, calls coming into the enterprise network could be sent back to ITSP 314 due to call interactions, such as the result of configurations that result in a call being sent back to an external network, call-forwarding, or the like. This can lead to a situation whereby both endpoint 302 and endpoint 304 are both anchored on the network of ITSP 314. In such a case, SBC 306 may simply function as an RTP s ch such ha packets received from one call leg are switched to the other and vice-versa.

Many service providers deploy Latching and Hosted NAT traversal solutions in their network that require peer networks to stream the first RTP packet. Given a hairpinned call flow, this can lead to each call leg (e.g., the call legs associated with endpoint 302 and endpoint 304) waiting the other to trigger latching and the subsequent flow of RTP packets. In addition, the service provider, such as ITSP 314, will remain unaware that the two call legs are related to the same media session.

Indeed, consider the case in which a cellular phone is the calling phone. Further, assume that the second phone is registered to an enterprise PBX (e.g., an IP phone) or calls in the network are forwarded back to the service provider network. There can even be instances in which the IP phone registered to the enterprise PBX either forwards or transfers the call back to the service provider network. In each of these cases, the 'final' phone may be a third phone (e.g., another mobile phone, IP phone, etc.) that is only reachable over the PSTN. Under these circumstances, a media deadlock can occur, as each media endpoint may be waiting for the other to start sending media packets, resulting in a media deadlock.

Resolving Media Deadlocks Using STUN

The techniques herein introduce a mechanism whereby media deadlocks created due to certain common call flow interactions may be resolved using STUN indication messages carrying customized attributes.

Specifically, according to one or more embodiments of the disclosure as described in detail below, a device in communication with a service provider network obtains first information regarding a first call leg of a media session associated with a first endpoint. The device also obtains second information regarding a second call leg of the media session associated with a second endpoint. Both of the first and second endpoints are anchored in the service provider network. The device makes a determination that the media session is being hairpinned, based on the first and second information. The device sends, based on the determination, an indication message using STUN along the first call leg that causes the first endpoint to begin sending a flow of media packets.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Figure 4:
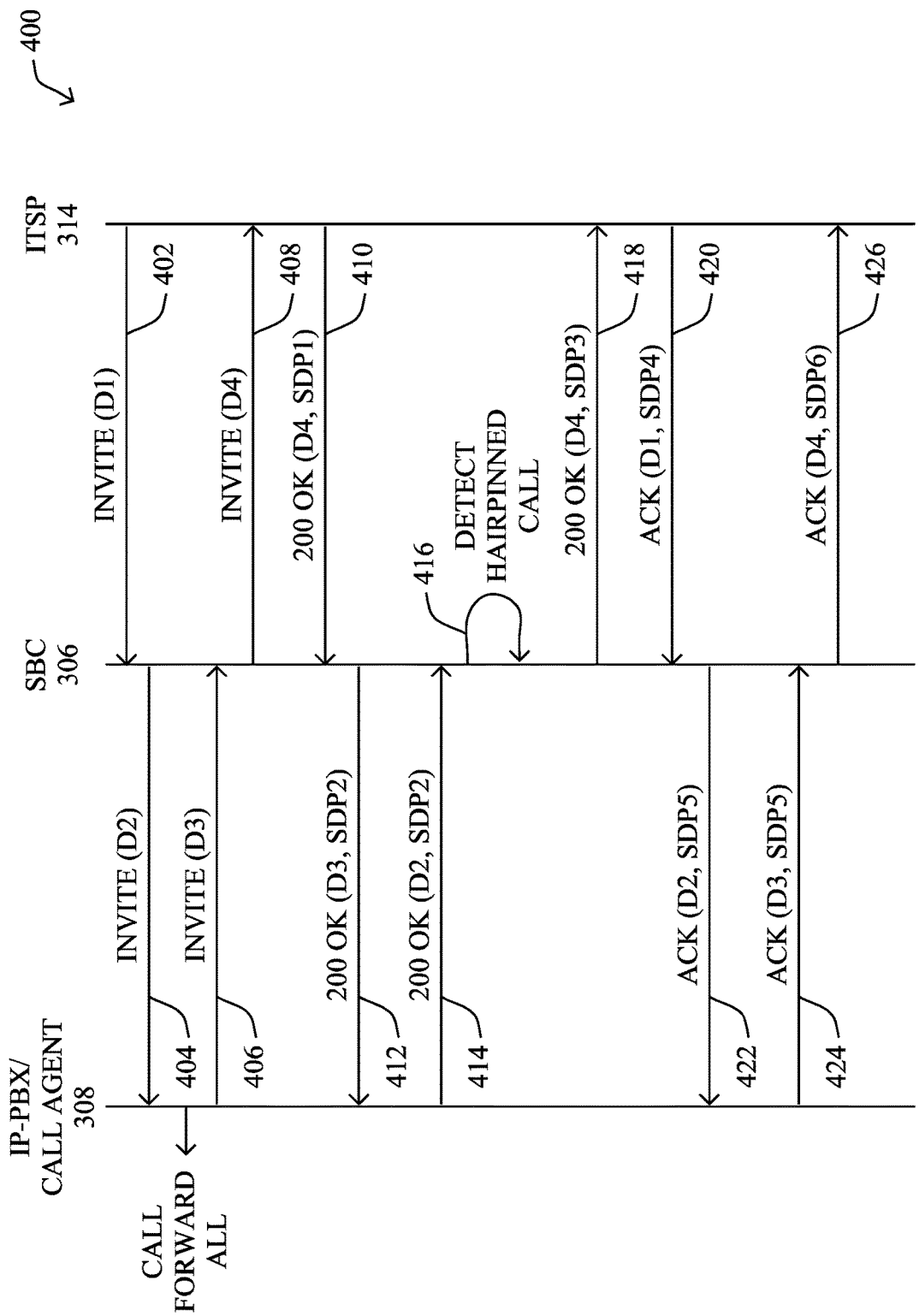
FIG. 4 illustrates an example process flow demonstrating a potential media deadlock.

Operationally, FIG. 4 illustrates an example process flow 400 demonstrating a potential media deadlock, according to various embodiments. Continuing the example of FIG. 3, consider the case in which IP-PBX/call agent 308, SBC 306, and ITSP 314 communicate with one another to support the signaling needed to establish a call.

As noted above, under normal circumstances, once all dialogs in the call flow are connected, and because of latching on the service provider network, a media path between the two RTP sources (e.g., endpoints 302-304 in FIG. 3) cannot be created, leading to a no-way audio call. To get around, the techniques herein propose the use of a STUN indication message sent by SBC 306 on either call leg, in various embodiments. In one embodiment, the STUN indication message may include a customized comprehension-optional attribute that encodes information about the IP address and port number on which the peer call awaits RTP transmission. In general, the proposed STUN indication message serves the following purposes:

It gets rid of the deadlock established in hairpinned calls as a result of latching. This is because the STUN messages use the same five-tuple as the eventual RTP or Secure RTP (SRTP) packets.

It provides explicit proof to ITSP 314 of a related call leg of the media session anchored in their network, as detailed below.

The packet will be non-arbitrary, purposeful, and context-driven.

To illustrate the sequence of events leading to SBC 306 resolving the media deadlock, assume that the following SIP INVITE messages are exchanged:

1. SBC 306 receives INVITE message 402 from ITSP 314 with SIP dialog D1.
2. SBC 306 sends a corresponding INVITE message 404 to IP-PBX/call agent 308 with SIP dialog D2.
3. SBC 306 receives an INVITE message 406 in response, with SIP dialog D3.
4. SBC 306 sends INVITE message 408 with SIP dialog D4 on to ITSP 314.

It should be noted that while the above illustrates the case of a SIP Delayed Offer, the techniques herein can equally be applied to early call offers, as well.

Once the above exchange occurs, SBC 306 may receive a SIP 200 OK message 410 from ITSP 314 for dialog D4 and a Session Description Protocol (SDP) body SDP1. As would be appreciated, SDP1 encapsulates the media IP address and port number of one of the first call anchored in the service provider network, ITSP 314.

In turn. SBC 306 may send a SIP 200 OK message 412 to IP-PBX/call agent 308 with dialog D3 and SDP body SDP2. In response, SBC 306 may receive a SIP 200 OK message 414 from IP-PBX/call agent 308 with dialog D2 and SDP body SDP2.

At this point, according to various embodiments, SBC 306 may make a detection 416 that the call is a hairpinned call, based on the received OK message 414. In turn, SBC 306 may identify the media listen address and port number for both calls anchored in ITSP 314 as follows:

1. SBC 306 sends a SIP 200 OK message 418 with SIP dialog D1 and SDP body SDP 3 to ITSP 314.
2. In response, SBC 306 receives a SIP ACK message 420 from ITSP 314 with dialog D1 and SDP body SDP4. As would be appreciated, SDP4 encapsulates the media listen IP address and port of the peer call anchored in ITSP 314.
3. SBC 306 then sends an ACK message 422 to IP-PBX/call agent 308 with dialog D2 and SDP body SDP5.
4. In response, SBC 306 receives ACK message 424 from IP-PBX/call agent 308 with dialog D3 and SDP body SDP5.
5. Finally, SBC 306 sends ACK message 426 to ITSP 314 with dialog D4 and SDP body SDP6.

Thus, from this exchange, SBC 306 now has the following information, in various embodiments:
 The media listen address and port number of the first call anchored in ITSP 314 from 200 OK message 410 with dialog D4 and SDP body SDP1.
 The media listen address and port number of the second call anchored in ITSP 314 from ACK message 420 with dialog D1 and SDP body SDP4.

Under normal circumstances, SBC 306 will not receive media packets for either call, due to the created deadlock that precludes the establishment of a media path between both RTP sources (e.g., endpoint 302 and endpoint 304 from FIG. 3).

According to various embodiments, SBC 306 may break the media deadlock by sourcing a STUN indication message that is sent on the same 5-tuple (i.e., source network address, destination network address, source port, destination port, and Layer 4 transport) as media packets sourced from SBC 306. In some embodiments, the STUN indication message may be formatted with either or both of the following comprehension-optional attributes:
 Peer Media Address and Port: This attribute may be used to convey the RTP IP address and port number of the peer call leg. The peer RTP IP address and port number conveyed should be that of the peer call anchored in the service provider network (e.g., ITSP 314) and not that of the call anchored on the SBC (e.g., SBC 306). In other words, the value of this attribute encapsulates the media IP address and port number of the peer call anchored in the service provider network such that this attribute is encoded to be identical to the MAPPED-ADDRESS attribute defined in the STUN standard. This attribute may also have a type 0xCFFE.
 Peer Call ID: This attribute is used to convey the SIP Call-ID of the peer call. The peer Call-ID conveyed should be that of the call anchored in the service provider network (e.g., ITSP 314) and not that of the call anchored on the SBC (e.g., SBC 306). The Peer Call ID attribute may also be a comprehension-optional attribute that has a type of 0xCFFF that has a value that encodes the SIP Call-ID of the peer call anchored in the service provider network.

Applying this to the case illustrated in FIG. 4, SBC 306 may source either or both of the following STUN indication message with the above information as follows, according to various embodiments:
 A first STUN indication message that SBC 306 sends from the IP address and port number encapsulated in SDP6 from ACK message 426 to the IP address and port number encapsulated in SDP1 from 200 OK message 410. This STUN message also encapsulates the media IP address and port number of the peer call anchored in ITSP 314 that was encapsulated in SDP4 in ACK message 420. Further, the STUN indication may also include the SIP Call-ID of the peer call anchored in ITSP 314 which, in this case, is the SIP Call-ID that identifies dialog D1.

A second STUN indication message that SBC 306 sources from the IP address and port number encapsulated in SDP3 from 200 OK message 418. It is targeted to the media listen IP address and port number encapsulated in SDP4 from ACK message 420. Additionally, this STUN indication message may include the media IP address and port number of the peer call anchored in the service provider network, ITSP 314, which is encapsulated in SDP1 from 200 OK message 410, in this instance. Also included in this STUN indication may be the SIP Call-ID of the peer call anchored in ITSP 314, which is the SIP Call-ID identifying dialog D4.

SBC 306 may continue to send either or both of these STUN indication messages until the flow of RTP packets is triggered. In turn, SBC 306 may cease its STUN signaling. This ensures that the STUN signaling used to address the media deadlock is purposeful and provides full context.

The techniques herein also address several security considerations with respect to the above STUN-based approach to breaking media deadlock. First, that the lack of a purpose driven STUN indication message could be leveraged by an attacker whereby the attacker sends STUN indication messages before the enterprise SBC does. Consequently, the arbitrary nature of the STUN packet itself could mean that service provider SBCs that implement media latching may latch onto an incorrect, and possibly malicious, source that is attempting to compromise the media streams. The hijacker need not necessarily be an external entity but can be a discrete internal device on the same network as the enterprise SBC. This leads to a situation where the media from both call legs will traverse the attacker. Indeed, once the remote SBC latches onto a "rogue" STUN packet, it will pick up the source and destination information from the headers of that packet. The attacker now has successfully redirected media from the enterprise SBC to itself and now privy to the entire communication session.

Using encrypted media and signaling may not address the above issue, either.

Indeed, even when encryption is used, the attacker can still source STUN indication messages to the entire port matrix of the ITSP BC in the hopes that one or more STUN indication messages lands on the ports negotiated for a hairpinned call, even though the attacker would be unable to exactly discover the port number(s) on which the STUN indication packets may be sent for a hairpinned call or identify when there is a hairpinned call. In this instance, the media may still be redirected to the attacker. Given that the attacker will not have the keys to decrypt the encrypted media, such as Secure Real-time Transport Protocol (SRTP) keys, the attacker would not be privy to the conversation and the call would likely fail as SBCs usually decrypt and re-encrypt with a different set of negotiated keys. However, at the very least, the attacker would be successful in redirecting media and causing the call to fail.

To address the above security concerns, the SBC (e.g., SBC 306) may also source its STUN indication message such that it also includes a MESSAGE-INTEGRITY attribute, according to various embodiments. This can be achieved as follows:
 First, the ITSP may advertise a username/password in the SDP body for each call setup between the enterprise and service provider network. Note that (The SDP could be carried in an INVITE, 18x, 200 OK, or ACK message, depending on the direction of the call and whether the call is an early/delayed offer. For instance, ITSP 314 may include a username/password in SDP1 of 200 OK message 410, as shown in FIG. 4.

Then, after the enterprise SBC detects a media hairpinned call, it sends a STUN indication (of both, related call legs) to the imp such that the username:PeerCallID are hashed with the password provided for that call leg. For instance, once SBC 306 makes hairpinned call detection 416, it may include the relevant hash in a STUN indication to ITSP 314. This indication provides proof and serves as the trigger to latch and start media transmission for the ITSP. The indication can be sent every $T_n$ seconds until the SBC does not detect media flow for the call legs in question.

In some embodiments, the username and password for each call could be indicated using two new SDP attributes termed loop-ufrag and loop-password. These attributes are similar to the ice-ufrag and ice-pwd attributes defined in the ICE protocol. However, the ice-ufrag and ice-pwd passwords are not used in this context to avoid any potential overlap problems that might arise.

Explicitly including the peer media address and SIP Call ID in STUN indication messages has the dual benefit of getting rid of latching deadlocks and allowing the service provider networks to verify the existence of related calls (with distinct SIP Call-IDs) on their network. Note that using RTPtRTCP-based extensions would firstly require the SBC to source such packets for hairpinned calls, which would likely have to cat dummy information, such as a dummy payload, in the case of RTP, and dummy synchronization source (SSRC). The special formatting STUN introduced herein provides a cleaner, more efficient way of resolving media deadlocks.

Figure 5:
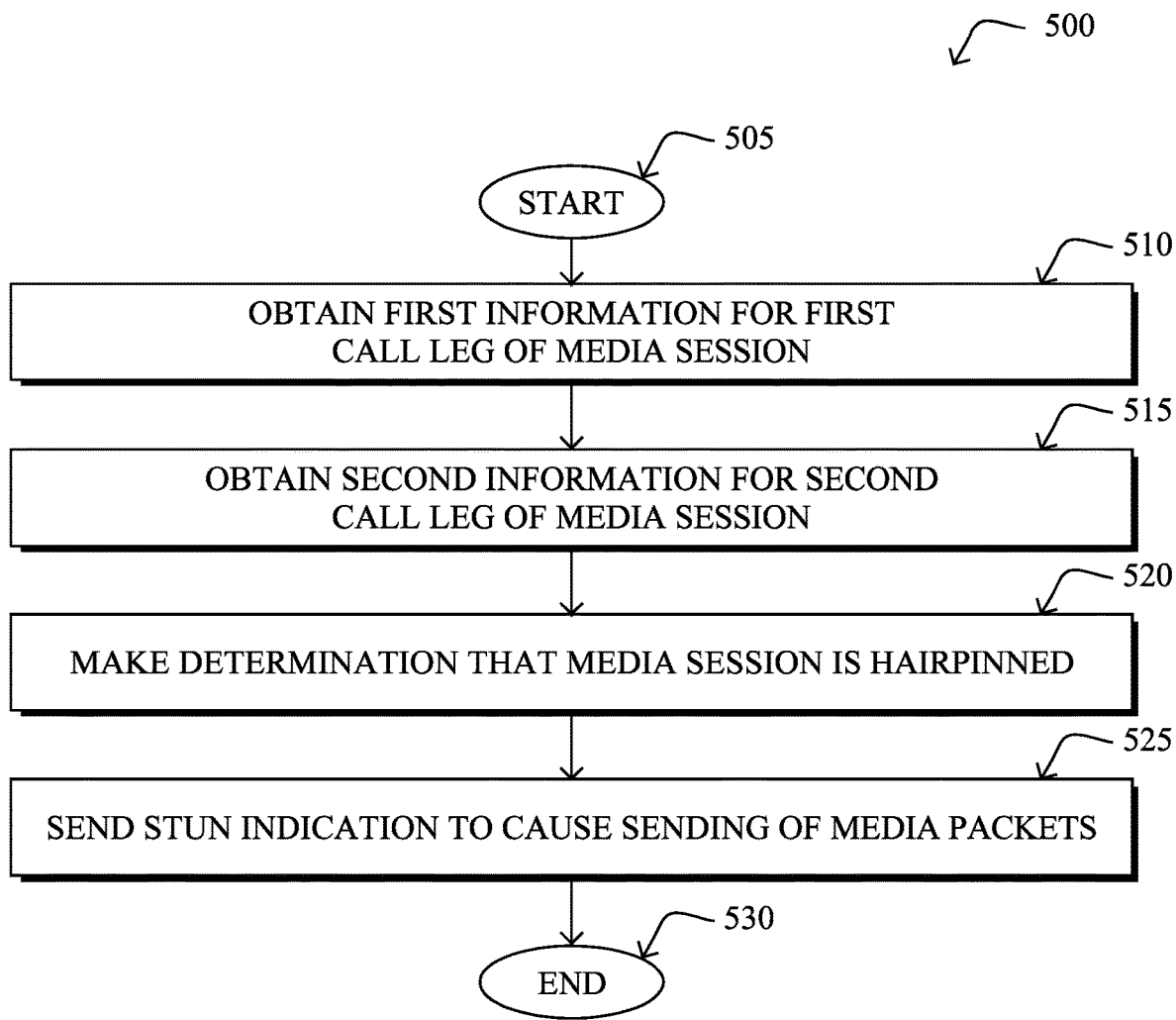
FIG. 5 illustrates an example simplified procedure for resolving a media deadlock using Session Traversal Utilities for Network Address Translators (STUN).

FIG. 5 illustrates an example simplified procedure for resolving a media deadlock using STUN, in accordance with one or more embodiments described herein. In various embodiments, procedure 500 may be performed by a specifically-configured device (e.g., a device 200 executing process 248), such as an SBC or other device. For instance, in various cases, the device may provide a SIP trunk between an IP-PBX and the service to provider network, such as an ITSP or the like. The procedure 500 may start at step 505, and continues to step 510, where, as described in greater detail above, a device may obtain first information regarding a first call leg of a media session associated with a first endpoint. In various embodiments, the first information may include an IP address and port associated with the first call leg, a SIP call-ID, or other such information.

At step 515, as detailed above, the device may obtain, from the service provider network, second information regarding a second call leg of the media session associated with a second endpoint. In various embodiments, the first endpoint and the second endpoint are both anchored in the service provider network. Similar to the first information, the second information may also be conveyed via SIP signaling and include information regarding the second call leg of the media session.

At step 520, the device may make, based on the first information and on the second information, a determination that the media session is being hairpinned, as described in greater detail above. For instance, the device may compare SIP messages to determine that the media session is being hairpinned and could cause a media deadlock between the two endpoints.

At step 525, as detailed above, the device may send an indication message using STUN along the first call leg that causes the first endpoint to begin sending a flow of media packets. For instance, the flow of media packets may be RTP packets, which the device may forward on towards the second endpoint. In various embodiments, the indication message includes a media address, a port, and a SIP call-ID associated with the second call leg. In some instances, to ensure the security of the indication, the device may first receive a username and password associated with the media session from the service provider network. In turn, the device may generate a hash based on the username and password, then send the hash to the service provider network, allowing the service provider network to verify that the first and second call legs are for a shared media session and that the indication is legitimate. In a further embodiment, the device may also send a STUN-based indication along the second call leg, as well, in a similar manner, but with the media IP address, port, and SIP call-ID, to cause the second endpoint to begin sending a flow of media packets towards the first endpoint. Procedure 500 then ends at step 530.

It should be noted that while certain steps within procedures 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, alleviate media deadlocks that can occur as a result of SIP trunking by sending a STUN indication along a call leg, to trigger the sending of media packets. In some aspects, security mechanisms are also introduced to prevent a malicious entity from spoofing such STUN indications.

While there have been shown and described illustrative embodiments that provide for resolving media deadlocks using STUN, it is to be understood that various other adaptations and modifications may be made within the spirit and scope of the embodiments herein. For instance, while the techniques herein are described primarily with respect to certain devices performing the techniques herein, the techniques herein are not limited as such. Indeed, while the techniques herein are described primarily with respect to using STUN to resolve deadlocks in certain network environments, the techniques herein can also be applied to cloud deployments, where a deadlock is created between the local gateway (LOW) and the calling core infrastructure. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
 receiving, by a device in communication with a service provider network, a first message comprising first information regarding a first call leg of a media session associated with a first endpoint, wherein the first information comprises an IP address and a port number associated with the first call leg;

after receiving the first message, receiving, by the device, a second message comprising second information regarding a second call leg of the media session associated with a second endpoint, wherein the second information comprises an IP address and a port number associated with the second call leg, and wherein the first endpoint and the second endpoint are both anchored in the service provider network;

making, by the device and based on the first information and on the second information, a determination that the media session is being hairpinned; and sending, by the device and based on the determination, a Session Traversal Utilities for Network Address Translators (STUN) indication message along the first call leg that causes the first endpoint to begin sending a flow of media packets toward the second endpoint and via the device, wherein the STUN indication message includes a media address, a port, and a Session Initiation Protocol (SIP) call-ID associated with the second call leg.

2. The method as in claim 1, wherein the device comprises a session border controller.

3. The method as in claim 1, wherein the flow of media packets comprises Real-time Transport Protocol (RTP) packets or Secure RTP (SRTP) packets.

4. The method as in claim 1, wherein the first information and the second information are received via Session Initiation Protocol (SIP) messages.

5. The method as in claim 1, further comprising:
sending, by the device and based on the determination, a second indication message using STUN along the second call leg to cause the second endpoint to begin sending a flow of media packets.

6. The method as in claim 1, further comprising:
receiving, at the device and from the service provider network, a password associated with the media session;
generating a hash based in part on the password; and
sending the hash to the service provider network, wherein the hash is used by the service provider network to verify that the first call leg and the second call leg are for a shared media session.

7. The method as in claim 6, wherein the hash is sent as a STUN MESSAGE-INTEGRITY attribute.

8. The method as in claim 1, wherein the service provider network comprises an Internet telephony service provider (ITSP) network.

9. The method as in claim 1, wherein the device provides a Session Initiation Protocol (SIP) trunk between the service provider network and an Internet Protocol private branch exchange (IP-PBX).

10. An apparatus, comprising:
one or more network interfaces to communicate with a service provider network;
a processor coupled to the one or more network interfaces; and
a memory configured to store a process that is executable by the processor, the process when executed configured to:
receive a first message comprising first information regarding a first call leg of a media session associated with a first endpoint, wherein the first information comprises an IP address and a port number associated with the first call leg;
after receiving the first message, receive a second message comprising second information regarding a second call leg of the media session associated with a second endpoint, wherein the second information comprises an IP address and a port number associated with the second call leg, and wherein the first endpoint and the second endpoint are both anchored in the service provider network;
make, based on the first information and on the second information, a determination that the media session is being hairpinned; and
send, based on the determination, a Session Traversal Utilities for Network Address Translators (STUN) indication message along the first call leg that causes the first endpoint to begin sending a flow of media packets toward the second endpoint and via the device, wherein the STUN indication message includes a media address, a port, and a Session Initiation Protocol (SIP) call-ID associated with the second call leg.

11. The apparatus as in claim 10, wherein the apparatus comprises a session border controller.

12. The apparatus as in claim 10, wherein the flow of media packets comprises Real-time Transport Protocol (RTP) packets or Secure RTP (SRTP) packets.

13. The apparatus as in claim 10, wherein the first information and the second information are received via Session Initiation Protocol (SIP) messages.

14. The apparatus as in claim 10, wherein the process when executed is further configured to:
send, based on the determination, a second indication message using STUN along the second call leg to cause the second endpoint to begin sending a flow of media packets towards the first endpoint.

15. The apparatus as in claim 10, wherein the process when executed is further configured to:
receive, from the service provider network, a password associated with the media session;
generate a hash based in part on the password; and
send the hash to the service provider network, wherein the hash is used by the service provider network to verify that the first call leg and the second call leg are for a shared media session.

16. The apparatus as in claim 10, wherein the service provider network comprises an Internet telephony service provider (ITSP) network.

17. The apparatus as in claim 10, wherein the apparatus provides a Session Initiation Protocol (SIP) trunk between the service provider network and an Internet Protocol private branch exchange (IP-PBX).

18. A method comprising:
obtaining, by a device in communication with a service provider network, first information regarding a first call leg of a media session associated with a first endpoint;
obtaining, by the device, second information regarding a second call leg of the media session associated with a second endpoint, wherein the first endpoint and the second endpoint are both anchored in the service provider network;
making, by the device and based on the first information and on the second information, a determination that the media session is being hairpinned;
sending, by the device and based on the determination, a Session Traversal Utilities for Network Address Translators (STUN) indication message along the first call leg that causes the first endpoint to begin sending a flow of media packets, wherein the STUN indication message includes a media address, a port, and a Session Initiation Protocol (SIP) call-ID associated with the second call leg;
receiving, at the device and from the service provider network, a password associated with the media session;
generating a hash based in part on the password; and
sending the hash to the service provider network, wherein the hash is used by the service provider network to verify that the first call leg and the second call leg are for a shared media session.

* * * * *

UNITED STATES PATENT AND TRADEMARK OFFICE
CERTIFICATE OF CORRECTION

| | | |
|---|---|---|
| PATENT NO. | : 11,405,356 B2 | Page 1 of 2 |
| APPLICATION NO. | : 17/000794 | |
| DATED | : August 2, 2022 | |
| INVENTOR(S) | : Ishan Zutshi et al. | |

It is certified that error appears in the above-identified patent and that said Letters Patent is hereby corrected as shown below:

In the Specification

Column 1, Line 33, please amend as shown:
enterprise edge element (e.g., an SBC, etc.) merely functions Column 6, Line 37, please amend as shown:
testing and troubleshooting before committing configuration Column 7, Line 17, please amend as shown:
306 may simply function as an RTP switch such that packets Column 7, Line 24, please amend as shown:
associated with endpoint 302 and endpoint 304) waiting for the Column 8, Line 54, please amend as shown:
In turn, SBC 306 may send a SIP 200 OK message 412 to Column 10, Line 41, please amend as shown:
matrix of the ITSP SBC in the hopes that one or more STUN Column 11, Line 3, please amend as shown:
legs) to the ITSP such that the username:PeerCallID are Column 11, Line 24, please amend as shown:
RTP/RTCP-based extensions would firstly require the SBC Column 11, Line 26, please amend as shown:
likely have to carry dummy information, such as a dummy Signed and Sealed this
Twenty-fifth Day of October, 2022

Katherine Kelly Vidal
*Director of the United States Patent and Trademark Office*

CERTIFICATE OF CORRECTION (continued)
U.S. Pat. No. 11,405,356 B2

Column 11, Line 38, please amend as shown:
an IP-PBX and the service provider network, such as an Column 12, Line 43, please amend as shown:
gateway (LGW) and the calling core infrastructure. In